June 8, 1954

R. V. HOWELL 2,680,393

METHOD OF MAKING TACKS

Filed Dec. 24, 1949

ROBERT V. HOWELL
Inventor

By Herbert J. Brown

Attorney

June 8, 1954  R. V. HOWELL  2,680,393
METHOD OF MAKING TACKS
Filed Dec. 24, 1949  3 Sheets-Sheet 2

ROBERT V. HOWELL
Inventor

By Herbert J. Brown
Attorney

June 8, 1954
R. V. HOWELL
2,680,393
METHOD OF MAKING TACKS
Filed Dec. 24, 1949
3 Sheets-Sheet 3
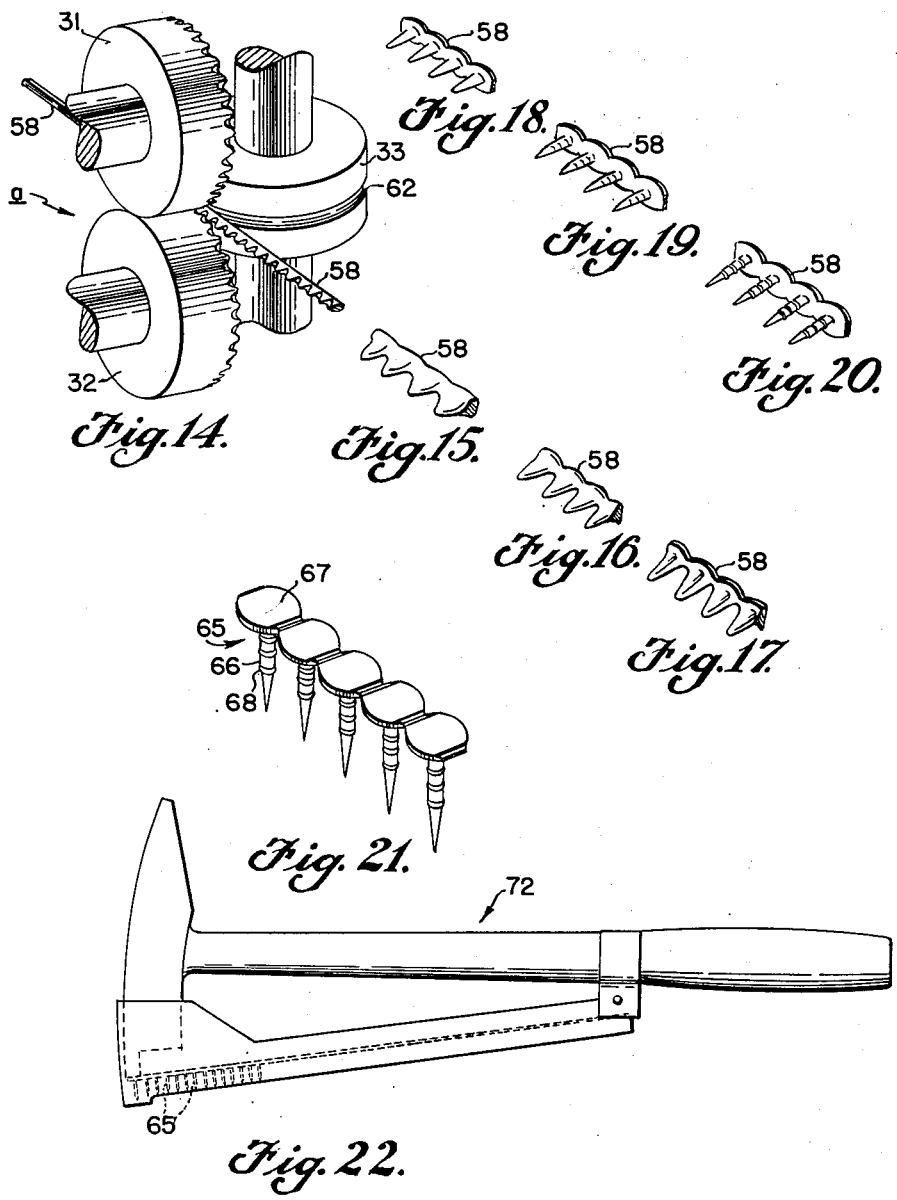
ROBERT V. HOWELL
Inventor
By Herbert J. Brown
Attorney Patented June 8, 1954

2,680,393

UNITED STATES PATENT OFFICE 2,680,393

METHOD OF MAKING TACKS

Robert Vincent Howell, Fort Worth, Tex., assignor to Tok, Inc., Amarillo, Tex., a corporation of Texas Application December 24, 1949, Serial No. 134,956

1 Claim. (Cl. 80—27)

This invention relates to a method for making tacks, such as those described in United States Patent No. 2,425,494 issued August 12, 1947, to A. M. Taylor, and wherein the tacks are integrally joined on the opposite sides of their heads and have their shanks arranged in the same direction.

An object of the invention is to provide a method of making the referred to tacks from rod or wire stock with the lengths of the individual tacks arranged perpendicularly to the strips of formed tacks.

Another object of the invention is to provide a method of forming tacks as above referred to, and wherein the stock material is completely formed into the heads and shanks without any "flash" or excess material therebetween.

These and other objects of the invention will become apparent from the following description and the accompanying drawings, wherein:

Figure 14 is a perspective view of the roller dies comprising the first pass or station.

Figures 15 through 20 respectively illustrate the formation of the tacks as they successively pass through the roller dies of the intermediate stations.

Figure 21 is a perspective view of a strip of completed tacks.

Figure 22 is an elevation of an automatic tack hammer, of the type previously referred to, and showing the position of the strip of joined tacks therein by means of dotted lines.

Figure 1:
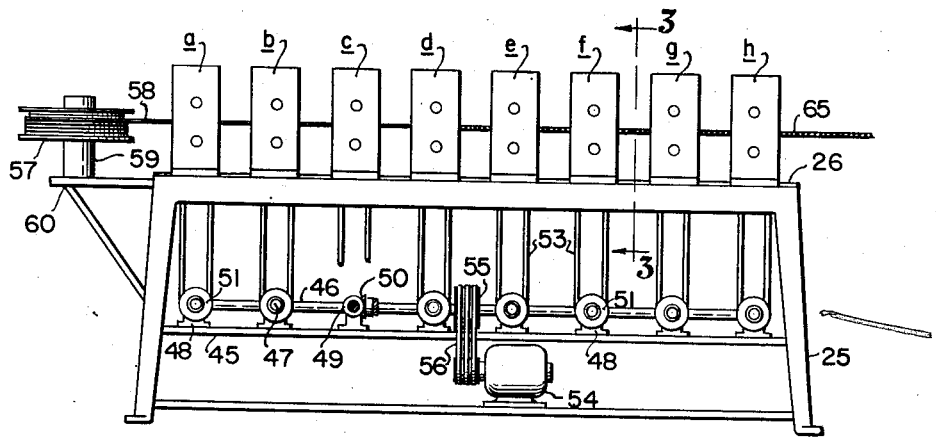
Figure 1 is a side elevation of a forming machine having multiple roller dies for carrying out the present invention.
Figure 2:
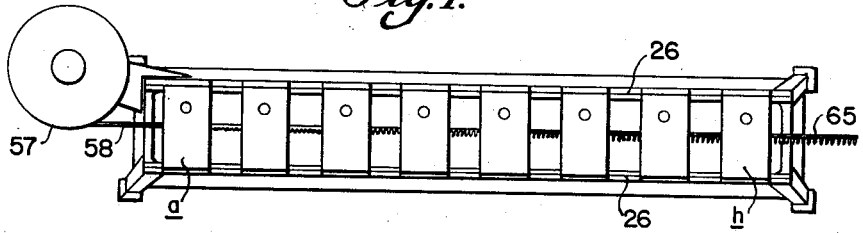
Figure 2 is a plan view of the machine illustrated in Figure 1.

A machine for carrying out the present method is illustrated in Figure 1, and includes a suitable frame or bed 25 having parallel V-ways 26 along its upper surface. Spaced rectangular bearing supporting frames 27, having grooved feet 28 for engagement on the V-ways 26, are adjustably secured relative to each other, on the bed 25, by means of clamp plates 29 having their outer ends contacting the lower surfaces of said V-ways. Bolts 30 pass through the clamp plates 29 and are threadedly engaged in the lower ends of the bearing supporting frames 27. Each bearing frame 27 supports a pair of upper and lower horizontal roller dies, numbered 31 and 32, and a vertical roller die 33 in contact with the ends of the first said dies where the latter contact each other. The horizontal roller dies 31 and 32 are mounted on spindles 34 and 35 which have their outer ends journaled in the frame 27, and have their inner ends mounted in and positioned through bearing support brackets 36 and 37 which are secured to the inner surface of the frame 27. Each vertical roller die 33 is mounted on a vertical shaft 38 having its ends journaled in the brackets 36 and 37. Other brackets 39 and 40 are secured to one inner vertical wall of the frame 27 for additionally supporting the vertical shaft 38. Bevel gears 41 and 42 are mounted on the inner ends of the horizontal shafts 34 and 35 and mesh with gears 43 and 44 on the vertical shaft 38. Beneath the V-ways 26, and supported by the bed 25, there is a horizontal support 45 upon which a drive shaft 46 is mounted, and which drive shaft is positioned beneath all of the lower roller die spindles 35. Stub shafts 47, perpendicular to the drive shaft 46, are mounted in bearings 48, and are driven by bevel gears 49 on their inner ends which mesh with other bevel gears 50 mounted on the drive shaft 46. Variable speed pulleys 51 are mounted on the outer ends of the stub shafts 47 and drive pulleys 52 secured on the lower horizontal die spindles 35. Continuous belts 53 connect the variable speed pulleys 51 with their respective driven pulleys 52. Openings are formed in the lower ends of the frames 27 to accommodate the belts 53. As will become apparent, ordinary driving pulleys of the same size may be used in place of the variable speed pulleys by progressively enlarging the pairs of horizontal dies 31 and 32 of the successive stations wherein the largest pair of dies is located at the discharge end of the machine. The drive shaft 46 is driven by a motor 54 connected with a driven pulley on said shaft by means of belts 56.

Figure 3:
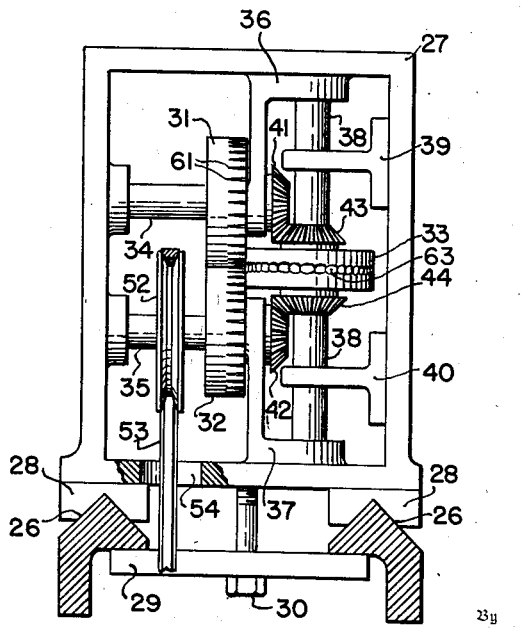
Figure 3 is an enlarged lateral sectional view taken on lines 3—3 of Figure 1.
Figure 4:
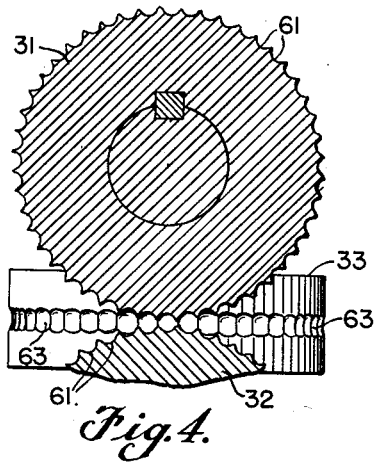
Figure 4 is a sectional and elevational view of the roller dies illustrated in Figure 3, and shown at a right angle with respect thereto.
Figure 5:
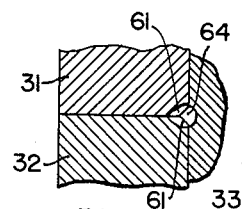
Figures 5 through 12 are broken sectional views of roller dies, and shown at a right angle with respect to Figure 4, and illustrating the progressive formation of the tacks.
Figure 6:
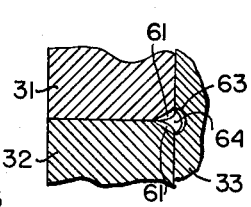
Figure 7:
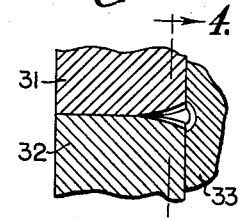
Figure 8:
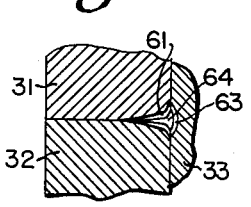
Figure 9:
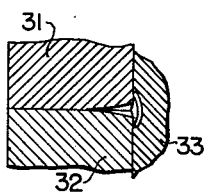
Figure 10:
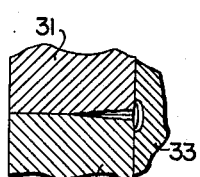
Figure 11:
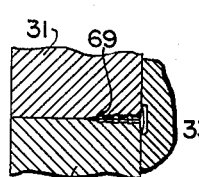
Figure 12:
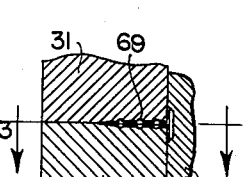
Figure 13:
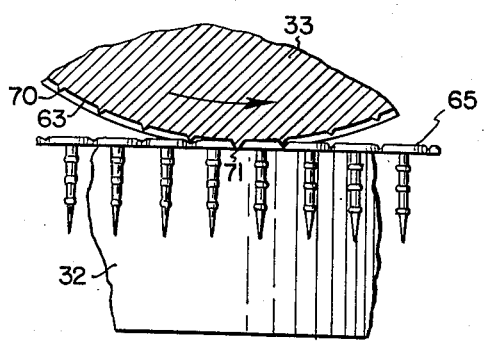
Figure 13 is a plan view showing a serrating die for forming indentions or serrations between the joined heads of the tacks.

As shown in Figure 1, the respective stations are indicated by the letters a through h, and each station includes a pair of horizontal dies 31 and 32 and a vertical die 33, such as shown in Figure 3. A reel 57, containing a roll of wire stock 58, is mounted on a vertical spindle 59 mounted on a table 60 outwardly of the end of the bed 25 and opposite the first station a. The horizontal dies 31 and 32 are provided with spaced corresponding shank forming cavities 61 around their peripheries adjacent the vertical roller die 33. A groove 62 is formed around the vertical roller die 33 of the first station a, and which groove is located opposite the open ends of the cavities 61 of the horizontal dies 31 and 32. Tack head cavities 63 are formed in the vertical roller 33 of the succeeding stages. The pairs of shank forming cavities 61 and the head forming cavities 63 coincide in the manner illustrated in Figures 4 and 5 through 12 during the rotation of the dies 31, 32 and 33. It will be noted that there is a central opening 64 at all times between the dies 31, 32 and 33, so as to not sever the wire stock 58. The first stage a forms the stock 58 into a substantially triangular cross section, together with enlargements which ultimately become the completed tacks 65. The successive passes or stations a through h progressively lengthen the tack shanks 66 and flatten the heads 67. It will be noted in Figures 5 through 12 that the cavities 61 of the respective stations in the horizontal dies 31 and 32 each become longer and narrower, and that the arcuate head forming cavities 63 in the respective rollers 33 become flatter. If desired, annular rings or shoulders 68 may be formed around the shanks by providing corresponding additional cavities 69 in the horizontal dies 31 and 32 in the last stages, such as f, g and h. The formation of the strip of the tacks 65 is progressively shown in Figures 14 through 20, and which figures generally conform with the shape of the material 58 as the same passes through the dies, as shown in Figures 5 through 12. Since the material 58 is pressed as it is formed, the speed of the dies 31, 32 and 33 must be slightly increased in each succeeding station a through h. The variable speed pulley 51 may be adjusted accordingly.

The last stage, h, includes the horizontal pair of dies 31 and 32 as previously described, and the vertical die 33 has its cavities 63 so close together that the resulting divisions 70 therebetween form grooves in the material 58 between the adjoining tack heads 67. One or several of the divisions may be longer, as indicated by the numeral 71, than the others so as to cut the strip of tacks into lengths suitable for use in an automatic tack hammer 72, such as illustrated in Figure 22.

The described form of the invention may be made in many ways within the scope of the appended claim.

What is claimed is:

The method of making strip tacks from wire wherein the heads thereof are integrally joined on opposite sides thereof lengthwise of the strip and having their shanks parallel with each other, the steps of progressively forming connected enlargements along the length of said wire, said enlargements being substantially conical in shape with their base or thickest parts joined and the apex ends thereof in spaced side by side relation, flattening the bases of said cones and forming the same into tack heads, and forming the remainder of the cones into shanks including the forming of said apex ends into tack points.

References Cited in the file of this patent

UNITED STATES PATENTS

| Number | Name | Date |
|---|---|---|
| 193,641 | Crawford | July 31, 1877 |
| 258,887 | Carpenter | June 6, 1882 |
| 290,272 | Rogers | Dec. 18, 1883 |
| 383,043 | Copeland | May 15, 1888 |
| 411,278 | Chase | Sept. 17, 1889 |
| 542,739 | Perkins | July 16, 1895 |

FOREIGN PATENTS

| Number | Country | Date |
|---|---|---|
| 1,267 | Sweden | Oct. 26, 1886 |
| 44,721 | Germany | Nov. 20, 1887 |